United States Patent
Kavuri et al.

(10) Patent No.: US 12,148,231 B2
(45) Date of Patent: Nov. 19, 2024

(54) SYSTEMS AND METHODS FOR EXTRACTING IN-VIDEO MOVING TEXT IN LIVE VIDEO STREAMS

(71) Applicant: Capital One Services, LLC, McLean, VA (US)

(72) Inventors: Vamsi Kavuri, Glen Allen, VA (US); Jignesh Rangwala, Glen Allen, VA (US); Santhi Sridharan, Glen Allen, VA (US); Muthukumaran Vembuli, Glen Allen, VA (US); Lee Adcock, Midlothian, VA (US); Mehulkumar Jayantilal Garnara, Glen Allen, VA (US); Srikanth Reddy Sheshaiahgari, Richmond, VA (US)

(73) Assignee: Capital One Services, LLC, McLean, VA (US)

( * ) Notice: Subject to any disclaimer, the term of this patent is extended or adjusted under 35 U.S.C. 154(b) by 97 days.

(21) Appl. No.: 17/818,293

(22) Filed: Aug. 8, 2022

(65) Prior Publication Data
US 2024/0046669 A1 Feb. 8, 2024

(51) Int. Cl.
*G06V 20/62* (2022.01)
*G06V 20/40* (2022.01)
*G06V 30/14* (2022.01)
*G06V 40/20* (2022.01)
*G10L 15/08* (2006.01)
*H04N 5/272* (2006.01)

(52) U.S. Cl.
CPC .......... *G06V 20/635* (2022.01); *G06V 20/41* (2022.01); *G06V 30/1448* (2022.01); *G06V 30/1456* (2022.01); *G06V 40/20* (2022.01); *G10L 15/08* (2013.01); *H04N 5/272* (2013.01)

(58) Field of Classification Search
None
See application file for complete search history.

(56) References Cited

U.S. PATENT DOCUMENTS

| | | | |
|---|---|---|---|
| 2015/0319510 A1* | 11/2015 | Ould Dellahy, VIII | H04N 21/4725 725/32 |
| 2020/0106813 A1* | 4/2020 | Vendrow | H04L 65/4015 |
| 2021/0056251 A1* | 2/2021 | Parmar | G06F 3/04847 |

* cited by examiner

*Primary Examiner* — Edward Martello
(74) *Attorney, Agent, or Firm* — Foley & Lardner LLP (57) ABSTRACT

In some embodiments, user extraction of in-video text may be facilitated. In some embodiments, a video associated with a video communication session may be processed to detect moving text to which a first user is referring in the video. Based on the detection of the moving text, location information associated with the moving text may be determined. For example, the location information may indicate spatial locations of the moving text. Based on the text location information, a graphical text location indicator may be overlayed on the video (e.g., on a first portion of a user interface of a user device) where the graphical text location indicator is presented proximate the moving text. Selectable text corresponding to the moving text and an auxiliary indicator corresponding to the graphical text location indicator may be presented on a second portion of the user interface.

20 Claims, 5 Drawing Sheets

SYSTEMS AND METHODS FOR EXTRACTING IN-VIDEO MOVING TEXT IN LIVE VIDEO STREAMS

BACKGROUND

Live video streams are often useful for presenting information. For instance, video conferencing is among one of the most popular forms of communicating today as it allows a plethora of people to connect and share information. During such live video streams, audience members may want to remember textual information that is presented. In many cases, however, such textual information may be presented only for a short amount of time as the camera pans to the next viewing angle or a presenter moves on from the topic, often leaving little time for the audience members to write down or otherwise copy such information.

SUMMARY

Methods and systems are described herein for improvements related to extracting text from video files. For example, methods and systems are described herein for user extraction of in-video text (or other descriptive item) that moves over time in a live video stream or other video.

As discussed above, live video streams may be used for presenting information to an audience. In such video streams, text may be presented explicitly (e.g., during a slide show presentation) or implicitly (e.g., in the background of the presentation, signage in the background, a book presented in the video, etc.). During the video stream however, the text may move over time. For example, as the viewing angle or the camera angle shifts, text that was presented at one time may no longer be visible to an audience member at a second time. This may cause a poor viewing experience as the audience member may have wanted to capture or otherwise record the text that was just presented. Additionally, as the video stream is a live video stream (e.g., during a web conference), the audience member may be unable to "rewind" the video stream to capture the text. Thus, the audience member misses out on capturing the text that may be important to them.

Additionally, where a presenting user is aware of important text that the presenter wants the audience to capture, the presenter may share the text via a chat box or other manual technique. To accomplish this, the presenter must periodically pause mid-presentation to type the text or otherwise instruct attendees to write the text down or otherwise record the text. This may cause significant disruptions during the presentation and decrease the quality of the presentation. Furthermore, as a presenter may determine mid-presentation that a certain piece of text should be shared with the attendees that the presenter did not prepare for (e.g., by creating a text document prior to the presentation with all relevant text to be shared), the presenter must also pause mid-presentation to share or otherwise instruct the attendees to capture the text, once again causing a poor user experience.

To overcome these challenges, natural language processing and gesture recognition may be performed on the video stream to detect moving text to which a presenting user is referring (e.g., by discussing text, by pointing to text, or otherwise referring to text). Based on the detection of the moving text to which the presenting user is referring, the system may overlay a graphical text location indicator over the live video stream and may present selectable text (e.g., that an attendee or the presenter may select or otherwise interact with) that corresponds to the moving text in an auxiliary region of a user interface. For example, as the moving text may be in view for a short period of time before the viewing or camera angle pans away from the text, by presenting selectable text in an auxiliary region, the attendees may have access to the text that would otherwise "disappear" from view, thereby improving the user experience. Additionally, by performing the natural language processing and gesture recognition on the video stream, the presenter is not required to create a document prior to the presentation (e.g., to allow attendees to access the text) or required to pause mid-presentation and may simply refer to the text during the video stream—thereby further improving the user experience.

Various other aspects, features, and advantages of the invention will be apparent through the detailed description of the invention and the drawings attached hereto. It is also to be understood that both the foregoing general description and the following detailed description are examples and not restrictive of the scope of the invention. As used in the specification and in the claims, the singular forms of "a," "an," and "the" include plural referents unless the context clearly dictates otherwise. In addition, as used in the specification and the claims, the term "or" means "and/or" unless the context clearly dictates otherwise.

DETAILED DESCRIPTION

In the following description, for the purposes of explanation, numerous specific details are set forth in order to provide a thorough understanding of the embodiments of the invention. It will be appreciated, however, by those having skill in the art that the embodiments of the invention may be practiced without these specific details or with an equivalent arrangement. In other cases, well-known structures and devices are shown in block diagram form in order to avoid unnecessarily obscuring the embodiments of the invention.

Figure 1:
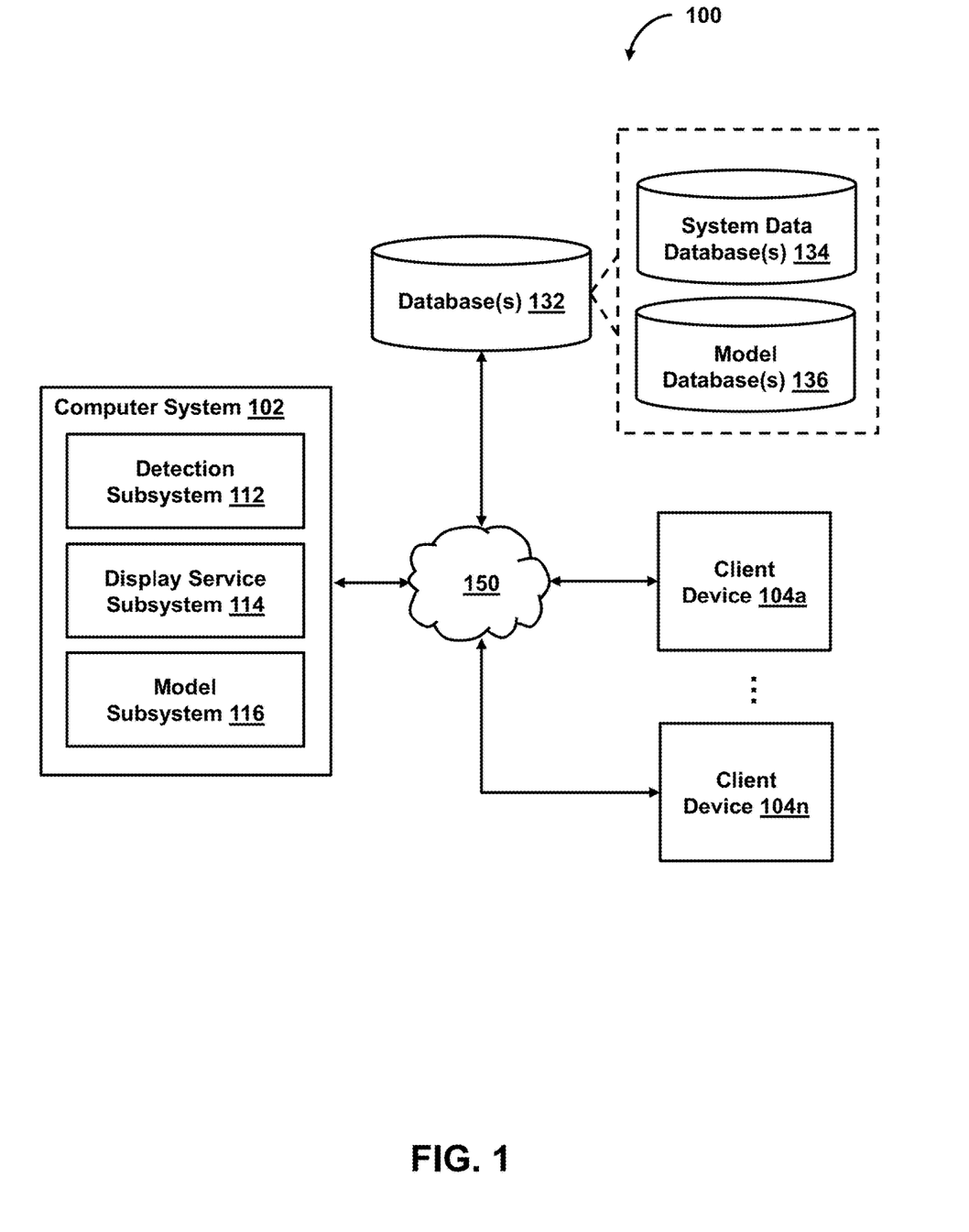
FIG. 1 shows a system for facilitating user extraction of in-video text, in accordance with one or more embodiments.

FIG. 1 shows a system 100 for facilitating user extraction of in-video text, in accordance with one or more embodiments. As shown in FIG. 1, system 100 may include computer system 102, client device 104 (or client devices 104a-104n), or other components. Computer system 102 may include detection subsystem 112, display service subsystem 114, model subsystem 116, or other components. Each client device 104 may include any type of mobile terminal, fixed terminal, or other device. By way of example, client device 104 may include a desktop computer, a notebook computer, a tablet computer, a smartphone, a wearable device, or other client device. Users may, for instance, utilize one or more client devices 104 to interact with one another, one or more servers, or other components of system 100. It should be noted that, while one or more operations are described herein as being performed by particular components of computer system 102, those operations may, in some embodiments, be performed by other components of computer system 102 or other components of system 100. As an example, while one or more operations are described herein as being performed by components of computer system 102, those operations may, in some embodiments, be performed by components of client device 104. As used herein, "mobile device," "user device," and "client device" may be used interchangeably unless context dictates otherwise. Additionally, it should be noted that, although some embodiments are described herein with respect to machine learning models, other prediction models (e.g., statistical models or other analytics models) may be used in lieu of or in addition to machine learning models in other embodiments (e.g., a statistical model replacing a machine learning model and a non-statistical model replacing a non-machine-learning model in one or more embodiments).

In some embodiments, system 100 may process a video file associated with a video communication session to detect moving text and present selectable text on a user interface. For example, the video file may be a live video stream that is associated with a communication session between multiple user devices. A presenting user may refer to moving text that is presented during the video stream and system 100 may overlay a graphical text location indicator over the live video stream (e.g., visually indicating the text to which the presenting user is referring). System 100 may present selectable text corresponding to the moving text on a portion of a user interface (e.g., to which audience members or the presenting user may see or interact with).

In some embodiments, system 100 may process a video file associated with a video communication session to detect moving text to which a first user is referring in the video file. For example, system 100 may perform natural language processing and gesture recognition on the video file to detect moving text to which the first user is referring. To ensure that other users (e.g., audience members of the video communication session) can visually see the text to which the first user is referring, system 100 may overlay a graphical text location indicator over the video file where the graphical text location indicator is presented proximate to the moving text and may present selectable text (e.g., corresponding to the moving text to which the first user is referring) on a portion of a user interface. In this way, as the moving text changes position during the live video stream, which may disappear from view when a camera or viewing angle changes, the first user or the audience members of the video communication session may be able to access the moving text in a selectable format (e.g., being able to select, copy, click, or otherwise interact with the moving text), which otherwise be may inaccessible (e.g., due to the camera or viewing angle changing)—thereby improving the user experience.

Subsystems 112-116

In some embodiments, detection subsystem 112 may process a video file. For example, detection subsystem 112 may process a video file to detect text to which a user is referring in the video file. As used herein, a "video file" may be any type of video file. For example, the video file may be a live video stream, a video file that is associated with a video communication session, a pre-recorded video file, a live stream of a pre-recorded video file, or other video file of any format. For instance, where the video file is associated with a video communication session (e.g., a video conference), the video communication session may be between one or more user devices (e.g., client device(s) 104a-104n). For example, during a video communication session, a presenting user may present content remotely on a first user device and each audience member (e.g., viewing the presentation) may receive or view the video stream on respective user devices.

Users (e.g., a presenter or audience members) may refer to text that is being presented. For example, where the presenting user is commenting on a video of a city scape where signage is posted (e.g., street signs, advertisements, restaurant names, etc.), the presenting user may refer to a sign that is presented in the video stream. For instance, where the presenter discusses a street sign, such as "Main Street," detection subsystem 112 may be configured to detect the text to which the presenter is referring. As most video files (or other video conference content) involves changing viewing angles (e.g., such as when the camera which captured the video pans to a different viewing angle), the text that is presented may not be presented in a static location, but may appear to move (or otherwise change position). For example, as the camera angle (or viewing angle) changes, the text that the presenter (or an audience member) has referred to at a first time may not be within view at a second time. The text that the presenter refers to may be important to the audience members and without a mechanism for the audience members to capture the referred to text, the information may not be obtainable in the future. Thus, detection subsystem 112 may detect when a user (e.g., a presenting user, an audience member, etc.) refers to text by processing the video file.

Figure 2:
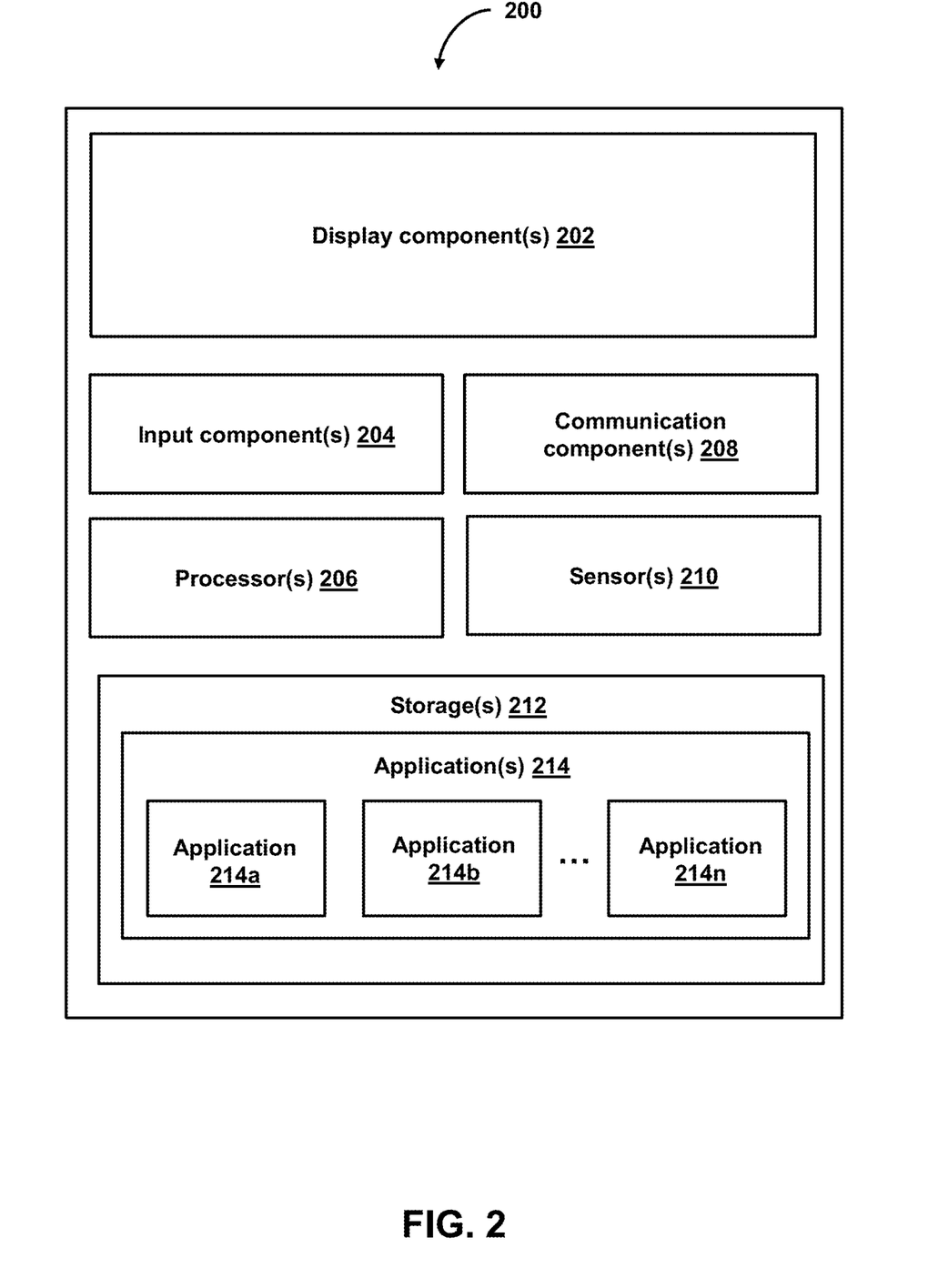
FIG. 2 shows a client device, in accordance with one or more embodiments.

In some embodiments, with respect to FIG. 2, one or more operations related to extracting in-video moving text in live video streams may be performed by client device 200. In some embodiments, client device 200 may correspond to client device 104 (FIG. 1). Client device 200 may include a plurality of components, such as display component(s) 202, input component(s) 204, processor(s) 206, communication component(s) 208, sensor(s) 210, storage(s) 212, application(s) 214, or other components. In some embodiments, storage 212 may store a variety of applications. For example, applications 214a-214n may represent different applications stored on client device 200. As another example, application 214 may be an application that is configured as a web browser or other application for processing video files via network 150. In some embodiments, communication components 208 may be configured for receiving one or video files (e.g., a live video stream, a live communication session, a pre-recorded video file, a pre-recorded live video stream, a pre-recorded live communication session, etc.), receiving or transmitting one or more messages (e.g., text messages, emails, instant messages, etc.), communicating with one or more components of system 100, or other functions, in accordance with one or more embodiments.

Referring back to FIG. 1, detection subsystem 112 may process a video file. For example, detection subsystem 112 may process the video file concurrently as the video file is being received to a user device (e.g., over network 150). For example, where the video file is associated with a live video communication session (e.g., a web conference), detection subsystem 112 may process the video file during the live video communication session. For instance, detection subsystem 112 may perform one or more processing methods on the video file such as natural language processing, gesture recognition, optical character recognition (OCR), audio processing, or other processing methods to detect text in the video file. In this way, the user experience may be improved as any text that is referred to during the live video stream may be detected in "real-time" or "near real-time" as opposed to pre-processing the video file. For example, as presenting users may not anticipate all text they wish to refer to prior to a live video stream, by processing the video file during the live video stream, presenting users may refer to text which they may or may not have originally been prepared to discuss—thereby improving the user experience.

In some embodiments, detection subsystem 112 may process a video file based on detecting a video file. For example, where a user is using a mobile device for a communication session, the mobile device may have one or more applications that is configured to detect a video file. For example, the application may be a pre-installed video conferencing application, a web-browser plug-in, or other application configured to detect a video file (or a streaming of a video file). In response to detection subsystem 112 detecting the video file, detection subsystem 112 may obtain one or more models configured for processing the video file. For example, detection subsystem 112 may communicate with model subsystem 116 to obtain one or more models from model database 136. As an example, model database 136 may store models that are configured for processing a video file. For instance, the models in model database 136 may be models configured for processing a video file (e.g., to detect text that is referred to by a user, to detect text that is presented in the video file, etc.) such as Natural Language Processing (NLP) model, Gesture recognition model, Convolutional Neural Network (CNN), Recurrent Neural Network (RNN), Neural Network (NN), Support Vector Machine (SVM), Deep Learning model, Long Short-Term Memory (LSTM), Optical Character Recognition (OCR), or other models. In some embodiments, the mobile device may have one or more pre-installed models configured for processing the video file (e.g., stored in storage 212). For example, the one or more pre-installed models may be the same or similar to the models stored in model database 136. In this way, processing the video file may occur via the users mobile device thereby decreasing video file processing time.

In some embodiments, model subsystem 116 may train or configure one or more prediction models to facilitate one or more embodiments described herein. In some embodiments, such models may be used to detect text to which a user is referring in a video file. Additionally, in some embodiments, such models may be used to detect text that is presented in a video file. As an example, such models may be trained or configured to perform the foregoing functions by respectively mutually mapping input data and output data in nonlinear relationships based on learning (e.g., deep learning). Additionally, one or more pre-trained prediction models may be stored in model database 136. For example, model database 136 may store a plurality of machine learning models configured to generate predictions related to detecting text to which a first user is referring in a video file.

In some embodiments, the prediction models may include one or more neural networks or other machine learning models. As an example, neural networks may be based on a large collection of neural units (or artificial neurons). Neural networks may loosely mimic the manner in which a biological brain works (e.g., via large clusters of biological neurons connected by axons). Each neural unit of a neural network may be connected with many other neural units of the neural network. Such connections can be enforcing or inhibitory in their effect on the activation state of connected neural units. In some embodiments, each individual neural unit may have a summation function which combines the values of all its inputs together. In some embodiments, each connection (or the neural unit itself) may have a threshold function such that the signal must surpass the threshold before it propagates to other neural units. These neural network systems may be self-learning and trained, rather than explicitly programmed, and can perform significantly better in certain areas of problem solving, as compared to traditional computer programs. In some embodiments, neural networks may include multiple layers (e.g., where a signal path traverses from front layers to back layers). In some embodiments, backpropagation techniques may be utilized by the neural networks, where forward stimulation is used to reset weights on the "front" neural units. In some embodiments, stimulation and inhibition for neural networks may be more free-flowing, with connections interacting in a more chaotic and complex fashion.

Figure 3:
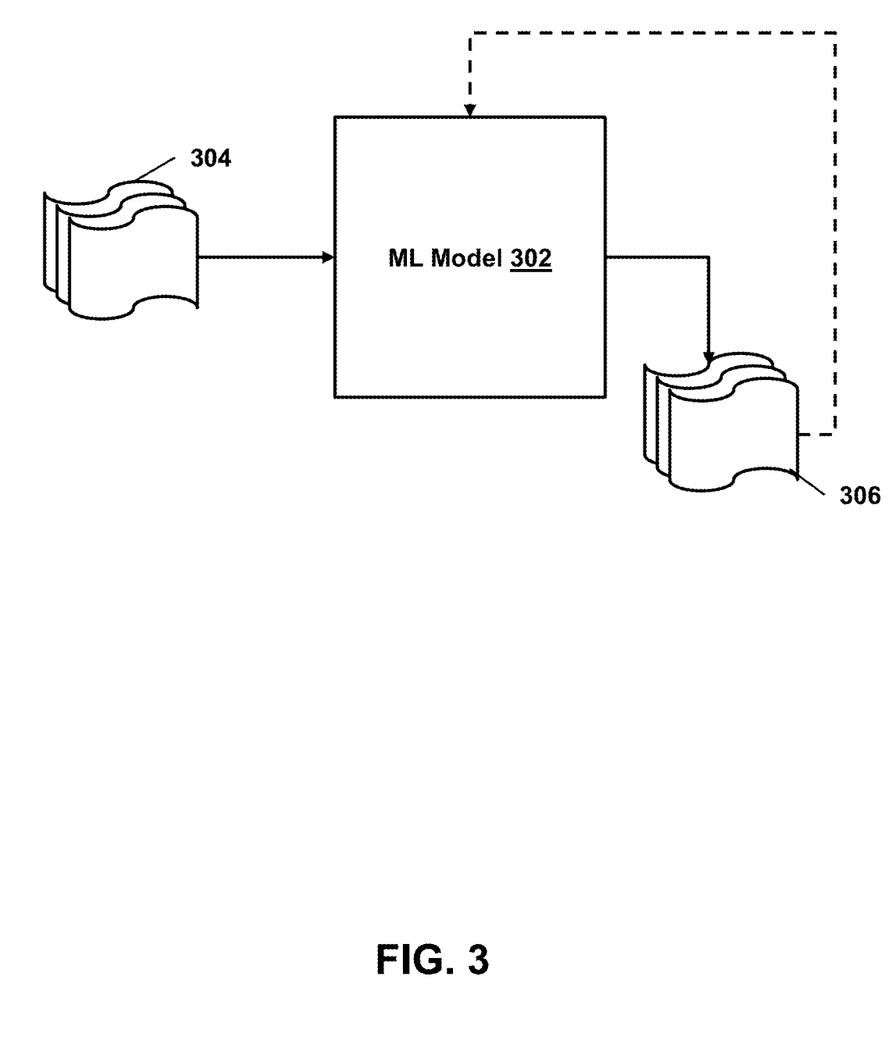
FIG. 3 shows a machine learning model configured to detect text to which a user refers to, in accordance with one or more embodiments.

As an example, with respect to FIG. 3, machine learning model 302 may take inputs 304 and provide outputs 306. In one use case, outputs 306 may be fed back to machine learning model 302 as input to train machine learning model 302 (e.g., alone or in conjunction with user indications of the accuracy of outputs 306, labels associated with the inputs, or with other reference feedback information). In another use case, machine learning model 302 may update its configurations (e.g., weights, biases, or other parameters) based on its assessment of its prediction (e.g., outputs 306) and reference feedback information (e.g., user indication of accuracy, reference labels, or other information). In another use case, where machine learning model 302 is a neural network, connection weights may be adjusted to reconcile differences between the neural network's prediction and the reference feedback. In a further use case, one or more neurons (or nodes) of the neural network may require that their respective errors are sent backward through the neural network to them to facilitate the update process (e.g., backpropagation of error). Updates to the connection weights may, for example, be reflective of the magnitude of error propagated backward after a forward pass has been completed. In this way, for example, the machine learning model 302 may be trained to generate better predictions.

As an example, where the prediction models include a neural network, the neural network may include one or more input layers, hidden layers, and output layers. The input and output layers may respectively include one or more nodes, and the hidden layers may each include a plurality of nodes. When an overall neural network includes multiple portions trained for different objectives, there may or may not be input layers or output layers between the different portions. The neural network may also include different input layers to receive various input data. Also, in differing examples, data may be input to the input layer in various forms, and, in various dimensional forms, may be input to respective nodes of the input layer of the neural network. In the neural network, nodes of layers other than the output layer are connected to nodes of a subsequent layer through links for transmitting output signals or information from the current layer to the subsequent layer, for example. The number of links may correspond to the number of nodes included in the subsequent layer. For example, in adjacent fully connected layers, each node of a current layer may have a respective link to each node of the subsequent layer, noting that in some examples such full connections may later be pruned or minimized during training or optimization. In a recurrent structure, a node of a layer may be again input to the same node or layer at a subsequent time, while in a bi-directional structure, forward and backward connections may be provided. The links are also referred to as connections or connection weights, as referring to the hardware implemented connections or the corresponding "connection weights" provided by those connections of the neural network. During training and implementation such connections and connection weights may be selectively implemented, removed, and varied to generate or obtain a resultant neural network that is thereby trained and that may be correspondingly implemented for the trained objective, such as for any of the above example recognition objectives.

In some embodiments, machine learning model 302 may be trained based on training data comprising (i) video data, (ii) textual data, and (iii) temporal data stored in system data database 134. For example, the video data may be data related to one or more videos, video files, communication sessions, presentations, video chats, web conferences, audio associated with the videos, video files, communication sessions, presentations, video chats, web conferences, gestures performed by a user in a video, or other video-related data. As another example, the textual data may be data related to one or more text strings, textual representations, words, phrases, sentences, or other textual-related data. As yet another example, the temporal data may be data related to timestamps (or other temporal information) related to the video data and the textual data (e.g., such as timestamps where textual data appears in the video data). In some embodiments, the training data may be labeled data to be used during supervised machine learning model training of machine learning model 302. For example, in supervised machine learning model training, the video data may be labeled with textual data and timestamp data (e.g., at which textual data occurs/is presented within the video data) such that the machine learning model may be trained based on the labeled video data. Additionally or alternatively, in some embodiments, the training data may be used (e.g., whether labeled or unlabeled) to train machine learning model 302 based on unsupervised machine learning model training. In this way, machine learning model 302 may generate better predictions of text to which a user is referring.

As an example, machine learning model 302 may be trained using training data stored in system data database 134. For instance, model subsystem 116 may obtain training data from system data database 134 to train machine learning model 302. As an example, machine learning model 302 may take the training data as input 304, and generate a prediction (or a set of predictions) indicating text to which a user is referring (or has referred) in a video file as output 306. In some embodiments, the generated prediction(s) may be fed back into machine learning model 302 to update one or more configurations (e.g., weights, biases, or other parameters) based on its assessment of its prediction (e.g., outputs 306) and reference feedback information (e.g., user indication of accuracy, reference labels, or other information).

In some embodiments, machine learning model 302 may be used to process a live video file. For example, machine learning model 302 may be configured to receive video data as input 304 and generate predictions as outputs 306 related to text to which a user is referring during a live video stream. For example, as a live video stream is received (e.g., at a user device), machine learning model 302 may be configured to obtain the video stream frame-by-frame and process the video file as each frame is received. For instance, machine learning model 302 may obtain information related to one or more frames of a live video stream with the associated audio data as input 304, and may generate a prediction (or a set of predictions) related to text to which a user referred to in the live video stream. In this way, by processing the video file in a frame-by-frame fashion, the machine learning model 302 may generate such predictions in "real-time" or "near-real time" (e.g., within 0.001 seconds)—thereby improving the user experience. For example, as opposed to conventional systems requiring a pre-recorded video file to process the video that may lead to a poor user experience, machine learning model 302 may be configured to process the video file as the video file is received, thereby improving the user experience.

In some embodiments, based on a detection of a video file, model subsystem 116 may select a model for use to process the video file. For example, model subsystem 116 may select an NLP model from model database 136 (or via the user's mobile device storing a model in one or more mobile device storages) to process the video file to detect text to which a first user is referring in the video file. For instance, where the video file is associated with a video communication session, model subsystem 116 may use an NLP model to detect text to which a first user is referring. As another example, the user's mobile device may use an NLP model to detect text to which a first user is referring.

In one use case, where the video file is associated with a video communication session, detection subsystem 112 may detect the video file. For example, a user may use a user device to view or present a presentation via a mobile device. For instance, during a video conference, a presenting user may present a presentation to an audience where each of the presenting user and the audience members view the presentation on a respective user device. As the presenting user presents the presentation, the presenting user or an audience member may refer to text that appears in the video conference.

Figure 4A:
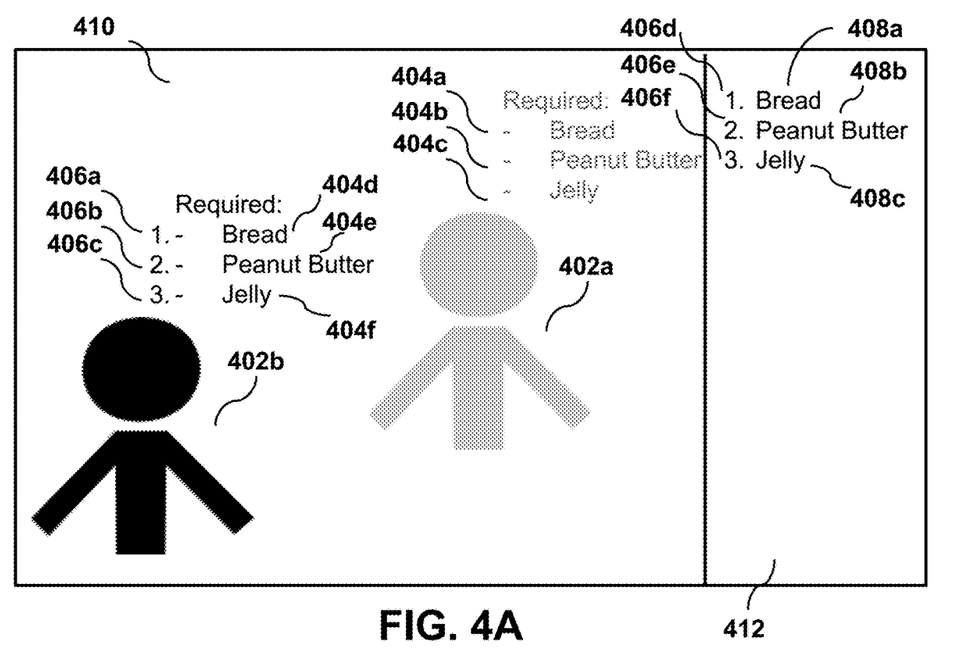
FIG. 4A-4B shows a user interface of a user device, in accordance with one or more embodiments.
Figure 4B:
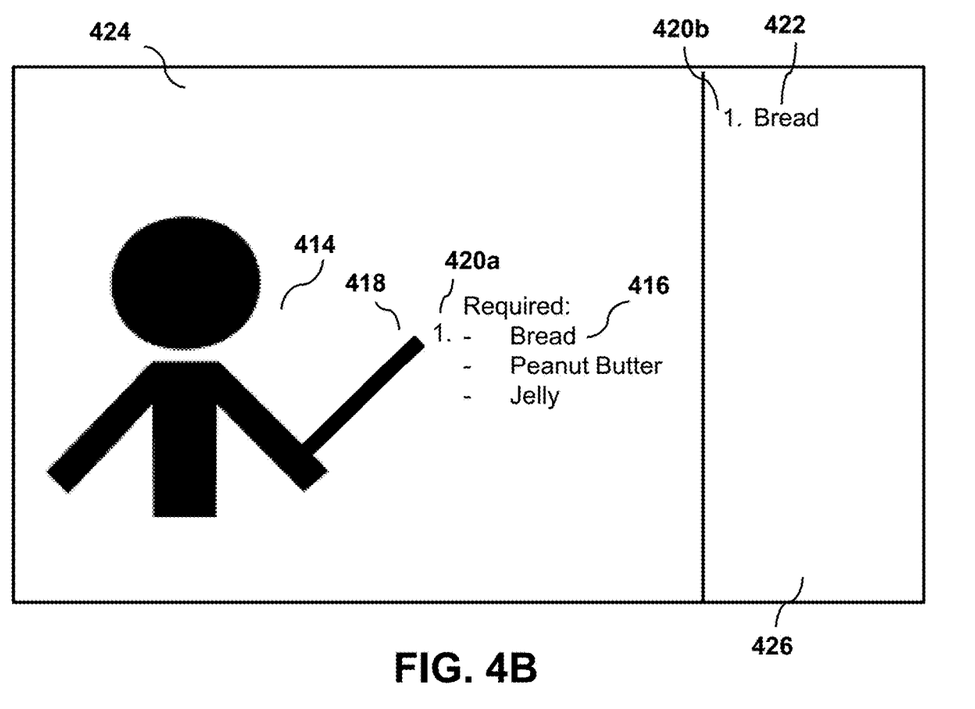

Referring to FIG. 4A, a presenting user may present information to an audience. For example, in one use case, where the presenting user (e.g., presenting user 402) is presented within the video file, the presenting user may present information pertaining to how to make a peanut butter and jelly sandwich during a live video stream where the text may move relative to the center of the live video stream. To illustrate, FIG. 4A shows text that may appear at a first timestamp, such as first text(s) 404a, 404b, and 404c. As the camera angle pans (or as the video stream continues), the text may appear to move to a different location such as the locations of second text(s) 404d, 404e, and 404f at a second timestamp. During the presentation, the presenting user may refer to the required ingredients to make the peanut butter and jelly sandwich. The audience members may want to record the text that is presented during the live video stream before the camera angle further pans until the text is off screen, thereby preventing the audience to record (e.g., write down) such information. To overcome this, detection subsystem 112 may detect the moving text to which the presenting user is referring and overlay a graphical text location indicator over the live video stream and present selectable text. It should be noted, that although FIG. 4A and FIG. 4B depict a presenting user as being presented within the video file, in alternative embodiments, a presenting user may not be viewable within the video file. For example, a presenting user may be using a user device to comment on a live video stream where the presenting user is not visible within the video file (e.g., commenting via an audio chat feature during a live video stream).

Referring back to FIG. 1, in some embodiments, detecting text to which a first user is referring may be based on one or more utterances of the first user. For example, detection subsystem 112 may communicate with model subsystem 116 to perform natural language processing on a video file to determine one or more utterances of the first user. For instance, where the first user is a presenting user, detection subsystem 112 may determine a set of utterances the presenting user speaks during the video file and store the set of utterances in system data database 134. Detection subsystem 112 may then determine timestamps at which each utterance of the set of utterances occur and may additionally perform optical character recognition (OCR) on the video file (e.g., at the timestamps) to extract textual data presented in the video file and may store such timestamps and textual data in system data database 134. For example, detection subsystem 112 may communicate with model subsystem 116 to obtain an OCR model from model database 136 that is configured to extract textual data (e.g., text strings, textual representations, sentences, phrases, etc.) that appear in the video file. Detection subsystem 112 may then determine whether the textual data presented in the video file correspond to one or more of the set of utterances of the first user.

For example, detection subsystem 112 may determine whether textual data presented at a first timestamp corresponds to an utterance of the user at the first timestamp. For example, detection subsystem 112 may compare the one or more utterances (e.g., as extracted via the NLP) to the textual data (e.g., extracted via the OCR) to determine a match between one utterance of the one or more utterances and between textual data extracted via the OCR at the first time stamp. In response to a match between an utterance of the first user and the textual data at the first timestamp, detection subsystem 112 may determine that an utterance of the user corresponds to textual data presented during the video file at the first time stamp. Detection subsystem 112 may then determine that the textual data corresponds to the utterance at the first time stamp is text referenced by the user.

Referring back to FIG. 4A, in one use case, where the video file is a live video stream and the first user is a presenting user 402, the presenting user 402 may be presenting how to make a peanut butter and jelly sandwich. During the live video stream such as a web conference, the presenting user 402 may verbally discuss text that is presented in the video file (e.g., first text 404*a*-404*c*). As discussed above, audience members (not pictured) may want to record the text, however as the viewing angle (or the position of the text) may change during the web conference, the text may appear to move to a different position such as where second text 404*d-f* is located. As the video file is a live video stream, detection subsystem 112 may perform natural language processing on the video file to determine one or more utterances of the presenting user 402 and respective time stamps at which the utterances occur. In other embodiments, where detection subsystem 112 is part of a mobile device application hosted on the user's mobile device, the user's mobile device may perform natural language processing on the video file to determine the one or more utterances of the presenting user 402 and respective time stamps at which the utterances occur. For example, as shown in FIG. 4A, the light gray presenting user 402*a* may refer to first text 404*a*-404*c* at a first time stamp. Alternatively, the light gray presenting user 402*a* may refer to a piece of the first text 404*a* (e.g., one ingredient) at the first time stamp. Dark dray presenting user 402*b* may correspond to the light gray presenting user 402*a*, however, at a second time stamp. Detection subsystem 112 may perform optical character recognition on the video file at the first time stamp to determine the textual data presented in the video file at the first timestamp and may further determine whether one or more utterances of the user (e.g., at the first time stamp) corresponds to textual data presented in the video file at the first time stamp. In response to detection subsystem 112 determining that the textual data presented in the video file at the first time stamp corresponds to one or more utterances of the presenting user at the first time stamp, detection subsystem 112 may determine the presenting user is referring to first text 404*a*-404*c*. It should be noted, that although the presenting user is pictured as being within frame of the live video stream, the presenting user may alternatively be out of frame of the live video stream (e.g., such as where the presenting user is discussing text via a microphone input of a mobile device used to present the information). For example, the presenting user may refer to text (e.g., through an audio input of the presenting user's mobile device) that is presented in the live video stream without physically appearing on screen to the audience members, such as when the text is being presented during a slide show presentation and the presenting user is commenting on the video behind a presenting mobile device.

Referring back to FIG. 1, in some embodiments, detecting text to which a user is referring in a video file may be based on a user input on a user device. For example, where the video file is a live video stream, the first user may be a presenting user that is referring to text within the live video stream. For instance, the live video stream may be viewed by the presenting user and audience members of the video stream via respective user devices. Detection subsystem 112 may detect that the presenting user is referring to text that is presented within the video file based on a user input via a user device. For example, a user input may be a touch, click, long-press, pinch, swipe, tap, or other user input. Detection subsystem 112 may determine based on the user input whether the user input corresponds to a location of textual data being presented in the video file. For example, where the user input is received by a user device having a touch screen, detection subsystem 112 may determine the location of the user input and may determine whether the location of the user input corresponds to a location of textual data being presented in the video file.

For example, where a presenting user (or an audience member) taps on a touch screen of the user's mobile device, the user's mobile device may send user input location information indicating the location of the user input (e.g., the location of the tap) and a time stamp at which the user input occurred to detection subsystem 112. Detection subsystem 112 may then perform OCR on a frame of the video file that corresponds to the timestamp at which the user input occurred to determine the location of the textual data. Detection subsystem 112 may then compare the location of the user input to the location of the textual data at the timestamp to determine whether the location of the user input corresponds to the location of the textual data. In response to the locations corresponding to one another, detection subsystem 112 may detect the text to which the user is referring.

In some embodiments, the location of the user input may correspond to the location of the textual data based on being within a threshold distance of one another. For example, the threshold distance may be 1 mm, 2 mm, 1 inch, 2 inches, 1 pixel, 2 pixels or other threshold distance. For instance, detection subsystem 112 may compare the location of the user input to the location of the textual data. In response to the location of the user input being within a threshold distance of the location of the textual data (e.g., 0-1 mm, 1-2 mm, 0-1 inch, 1-2 inches, 0-1 pixels, 1-2 pixels, etc.), detection subsystem 112 may determine that the location of the user input corresponds to the location of the textual data. Alternatively, if the location of the user input is not within a threshold distance of the location of the textual data, detection subsystem 112 may determine that the location of the user input does not correspond to the location of the textual data.

In some embodiments, detecting text to which a user is referring may be based on gesture recognition. For example, detection subsystem 112 may perform gesture recognition to determine whether a gesture of a user indicates a positive indication of a reference to textual data presented in a video file. For instance, a gesture of a user may be performed by a user that is being presented in a video file (e.g., a user that is visually displayed in the video file) or, a gesture may be performed by a user that is not being presented in a video file (e.g., a user that is not visually displayed in the video file). For example, a user that is being presented in a video file may be a video of an individual that is referring to a street sign in Times Square, NY. Additionally, a user that is not being presented in a video file may be a user presenting a slide show presentation (e.g., during a video conference) that is currently not being displayed in the video file. To clarify, a user that is not being presented in the video file may be a user who is using a mobile device to view or present (e.g., comment on) the video file. In such case, detection subsystem 112 may perform gesture recognition based on an image feed (e.g., via a webcam or other image sensor) from the user device where the user is not currently being presented in the video file. Thus, gesture recognition may be performed on individuals that are visually displayed in the video file or may be performed on individuals who are viewing the video file (e.g., via a respective mobile device).

As an example, referring to FIG. 4B, a user may be visually presented in a video file such as second user 414. Second user 414 may point (or perform another gesture such as a swipe, wave, pinch, slap, etc.) to textual information within the video file, and detection subsystem 112 may detect the gesture 418 (e.g., the pointing to the textual information 416). For example, detection subsystem 112 may use one or more gesture recognition models stored in model database 136 to determine whether a gesture of a user indicates a positive indication of a reference to textual data presented in the video file. As another example, the user's mobile device may use one or more gesture recognition models stored in one or more mobile device storages to determine whether a gesture of a user indicates a positive indication of a reference to textual data presented in the video file. In response to determining that the gesture indicates a positive indication of a reference to textual data presented in the video file, detection subsystem 112 may detect text to which a user is referring.

For instance, detection subsystem 112 may interact with model subsystem 116 to obtain a gesture recognition model from model database 136. Detection subsystem 112 may use the gesture recognition model to determine whether a gesture of the user indicates a positive indication of a reference to textual data presented in the video file. For example, detection subsystem 112 may provide the video file to the gesture recognition model to determine whether a gesture of the user indicates a positive indication of a reference to textual data presented in the video file. For example, the gesture recognition model may predict whether a user gestured to a piece of text presented in the video file. Alternatively, detection subsystem 112 may provide the gesture recognition model with (i) the video file and (ii) image data (e.g., from an image sensor of a user device) to determine whether a user has made a gesture that indicates a positive indication of a reference to textual data presented in the video file. For instance, where the user is not currently being presented in the video file itself, but rather viewing the video file from the user device of the user, detection subsystem 112 may request image sensor data from the user device of the user. Upon obtaining the image sensor data from the user device of the user, detection subsystem 112 may provide the gesture recognition model with the video file and the image data (e.g., from the user device of the user image sensor) to determine whether the user has made a gesture that indicates a positive indication of a reference to textual data presented in the video file. In response to the gesture recognition model indicating a positive indication, detection subsystem 112 may detect the text (referred to by the user) based on the gesture.

In some embodiments, based on the detection of text, detection subsystem 112 may determine location information associated with the text. For example, the location information associated with the text may indicate spatial locations of the text within a video file. For instance, the spatial locations may indicate one or more positions, coordinates, locations, or other location information of text within the video file. As another example, based on an OCR of the video file (or a frame of the video file), detection subsystem 112 may determine the location information associated with the text. In some embodiments, the text location information may be associated with moving text. For example, as a camera angle or viewing angle changes during the video file, text may appear to move over time. Detection subsystem 112 may determine the locations of the moving text over a time period in the live video stream and may store such locations of the moving text in system data database 134.

In some embodiments, display service subsystem 114 may overlay a graphical text location indicator over the video file. For example, display service subsystem 114 may obtain the text location information (e.g., indicating the locations of text that a user has referred to in the video file) and may overlay a graphical text location indicator over the video file on a first portion of a user interface of a user device. For example, the graphical text location indicator may be overlayed on the video file where the graphical text location indicator is presented proximate to the text (e.g., to which a user has referred to in the video file). In some embodiments, the user's mobile device may overlay a graphical text location indicator over the video file. For instance, the user's mobile device may use the text location information and may overlay a graphical text location indicator over the video file on a first portion of a user interface of the user's mobile device.

For example, with respect to FIG. 4A, display service subsystem 114 may overlay a graphical text location indicator 406a over the video file on a first portion 410 of a user interface where the graphical text location indicator 406a is presented proximate to text to which a user has referred to in the video file. As pictured, the graphical text location indicator may be a number that is presented proximate to text that a user has referred to in the video file. In some embodiments, however, the graphical text location indicator may be any graphical indicator such as a geometric shape, a letter, highlighting encasing text, a color-coded geometric shape, a box, a color coded box encasing text, or other graphical indicator. The graphical text location indicator may be presented proximate to the text where a presenting user or an audience member may visually see text that a user has referred to in the video file. As an example, the first portion 410 of the user interface may be a main portion of a user interface of a user device receiving the video file that is configured to present the video file while a second portion 412 of the user interface may be an auxiliary portion of the user interface configured to present selectable text to users. In this way, presenting users or audience members may visually see text that has been referred to by a user in the video file while presenting a selectable version of the text that has been referred to—thereby improving the user experience.

In some embodiments, the graphical text location indicator may be presented proximate to moving text. For example, as discussed above, where the camera angle (or viewing angle) changes during presentation of a video, the text that is presented in the video file may also appear to move. To ensure that presenting users and audience members are able to visually see the text that a user has referred to, the graphical text location indicator may be presented substantially stationary relative to the moving text over the time period in which the moving text is moving relative to the center of the live video stream. For example, the graphical text location indicator may be presented within a threshold distance of the text (e.g., to which a user has referred to in the video file) that is substantially stationary relative to the moving text. For instance, the threshold distance may be 1 mm, 2 mm, 1 inch, 2 inches, 1 pixel, 2 pixels, or other threshold distance of the text to which a user has referred to. As an example, where the graphical text location indicator is a number, the number may be presented within 2 pixels of the text to allow a user to visually see a graphical indicator of which text has been referred to in the video file. As the text that has been referred to may appear to move relative to the center of the video stream, the graphical text location indicator may also appear to move in a fashion that "follows" the text that has been referred to. For example, if the text a user has referred to moves 4 pixels to the right (e.g., relative to a user device display), the graphical text location indicator may also move 4 pixels to the right. In this way, the graphical text location indicator may visually appear to "follow" the text a user has referred to within a video file as the camera angle or viewing angle changes over time.

In some embodiments, selectable text may be presented on a second portion of a user interface of a user device. For example, display service subsystem 114 (or the user's mobile device) may display selectable text that corresponds to text to which a user referred to in the video file with an auxiliary indicator. For instance, the selectable text may be a text string, ascii characters, a set of text strings, a set of ascii characters, or other text that may be selected by a user. For instance, subsequent to detection of text that a user refers to in a video file, detection subsystem 112 may store a selectable text representation of the detected text in system data database 134. For example, where an OCR model (or other model) is used to detect text within a video file, the output of the OCR (e.g., a text string) may be stored in system data database 134. Display service subsystem 114 may retrieve the text stored in system data database 134 to display selectable text that corresponds to the text to which a user referred to in the video file. Additionally, display service subsystem 114 may generate for display an auxiliary indicator that corresponds to a graphical text location indicator (e.g., respective of text that a user has referred to) where the auxiliary indicator is presented proximate the selectable text. In this way, users may interact with text that is referred to in a video file—thereby improving the user experience. Additionally, as text a user refers to may pan off screen (e.g., out of view of a presenter or audience member), the selectable text may still be visible on the second portion of the user interface of a user device to ensure users are able to interact with such text, even when the text is not being currently displayed on the first portion of the user interface—thereby further improving the user experience.

Referring to FIG. 4B, display service subsystem 114 may present selectable text corresponding to the text (e.g., to which a user has referred to in the video file) and an auxiliary indicator corresponding to a graphical text location indicator proximate the selectable text. For example, a user (e.g., a presenting user) may refer to an ingredient for making a peanut butter and jelly sandwich in a video file. To ensure that other users (e.g., audience members) of the video file are able to interact with the text a user has referred to, selectable text 422 may be presented in a second portion 426 of a user interface of a user device along with an auxiliary indicator 420b that corresponds to a graphical text location indicator 420a (e.g., located in first portion 424 of the user interface) proximate the selectable text 422. For example, the auxiliary indicator 420b may be presented within a threshold distance of the selectable text 422. The threshold distance may be 1 mm, 2 mm, 1 inch, 2 inches, 1 cm, 2 cm, 1 pixel, 2 pixels, or other threshold distance. In some embodiments, the auxiliary indicator may correspond to the graphical text location indicator. For example, the auxiliary indicator may correspond to the graphical text location indicator by being the same indicator (e.g., a same number, a same geometric shape, a same color of highlighting, a same color of text, etc.) or by being a similar indicator (e.g., a same color but a different number, the same number but a different color, etc.). By presenting the auxiliary indicator proximate to the selectable text and by having the graphical text location indicator corresponding to the auxiliary indicator, users may visually see which text corresponds to one another—thereby improving the user experience.

In some embodiments, selectable text may be presented proximate the moving text. For example, display service subsystem 114 may present on the first portion of a user interface of a user device selectable text. For instance, to cater to the needs of users, not only may selectable text be presented in a second portion (e.g., an auxiliary portion) of a user interface of a user device, but may also be presented in the first portion (e.g., the main portion) of the user interface of the user device. For example, as text is referred to in the video file is displayed, a user may simply want to select the text on the main portion of the user interface (e.g., where the video file is being presented). To accomplish this, display service subsystem 114 may present selectable text (e.g., corresponding to text that has been referred to in the video file) proximate to the text. As an example, display service subsystem 114 may overlay the selectable text on top of the text to which a user has referred to in the video file. Additionally, to ensure that users can visually see which text has been referred to in the video file, a graphical text location indicator may be presented in association with the selectable text. For example, where the selectable text is overlayed on top of the text to which a user has referred to in the video file, the graphical text location indicator may be presented proximate to the text (e.g., to which a user has referred to in the video file) as well as the selectable text. In this way, not only may a user visually see which text has been referred to in the video file, but the user may also interact with the selectable text (e.g., clicking, selecting, copying, storing, or other interaction with the text).

In some embodiments, a portion of a user interface may change in size relative to a user input. For example, detection subsystem 112 (or the user's mobile device) may detect a user input indicating an alteration in size of a portion of the user interface. For instance, referring to FIG. 4A, although selectable text may be presented in a first portion 410 of a user interface or a second portion 412 of the user interface, the selectable text may appear to be too small or too large to a user. As such, the user may experience difficulty interacting with the selectable text—thereby leading to a poor user experience. Conventionally, a presenting user may be required to stop mid presentation and adjust the user interface size manually which may further lead to a poor user experience. To overcome this, detection subsystem 112 may detect a user input indicating an alteration in size of a portion of the user interface which may cause the selectable text to appear to change size (e.g., become larger, become smaller, etc.)—thereby improving the user experience as the presenting user is not required to stop mid-presentation.

In some embodiments, a portion of the user interface may change in size relative to the user input. For example, the user input may be a pinch-out (e.g., pinch to zoom out, reverse pinch, etc.), a pinch-in (e.g., a pinch to zoom in, pinch, etc.), a swipe up, a swipe down, a swipe left, a swipe right, or other user input indicating an alteration in size of a portion of the user interface. As another example, the user input may indicate an alteration in size of the selectable text itself (e.g., a font size increase, decrease, or otherwise change the selectable text size). Detection subsystem 112 (or the user's mobile device) may determine the stroke size of a user's input. The stroke size of the user's input may be based on an amount of pixels the user input is associated with (e.g., length of the user input) and the stroke size may correspond to the size of a portion of the user interface (e.g., first portion 410, second portion 412, or both first and second portions). Additionally or alternatively, the stroke size of the user's input may correspond to the size of the selectable text, the dimensions of the selectable text, or the font size of the selectable text. For instance, where a user pinches out, detection subsystem 112 may determine a difference in the amount of pixels between (i) the locations of the user's fingers when the user begins to pinch (e.g., a starting position of the user input) and (ii) the locations of the user's fingers when the user stops the pinch (e.g., the final position of the user input). The difference in the amount of pixels (e.g., stroke size) may correspond to a predetermined user interface size or a predetermined text size. For instance, where the stroke size is 0-5, 0-10, 5-15, 5-20 pixels, the stroke size may correspond to a user interface size of 1×, 2×, 3×, 4× larger the original size of the user interface (or portion thereof). Alternatively, where the user pinches in (e.g., indicating a zoom out), the stroke size may correspond to a user interface size of 1×, 2×, 3×, 4× smaller the original size of the user interface (or a portion thereof). It should be noted, that although 1×, 2× 3×, 4× smaller/larger than the original size of the user interface is described, other size metrics may be used such as, but not limited to, dimensions, magnification, or other metric indicating the size of the user interface, in accordance with one or more embodiments.

As another example, the stroke size may correspond to a size of the selectable text. For instance, where the user pinches outward (e.g., to zoom in) and the stroke size is 0-5 pixels, the font size of selectable text may increase by one level of magnitude of font size. To clarify, if the font size of the selectable text is currently set to a font size of 12 points, when the stroke size is between 0-5 pixels during a pinch-out, the font size may increase to a font size of 13 points. Alternatively, where the user input is a pinch-in (e.g., a zoom out) and the stroke size is 0-5 pixels, the font size of the selectable text may decrease by one level of magnitude. It should be noted, that although 0-5 pixels is described and that increasing/decreasing the font size by one level of magnitude is described, other pixel correspondences and font size metrics may be used, in accordance with one or more embodiments.

Example Flowchart

Figure 5:
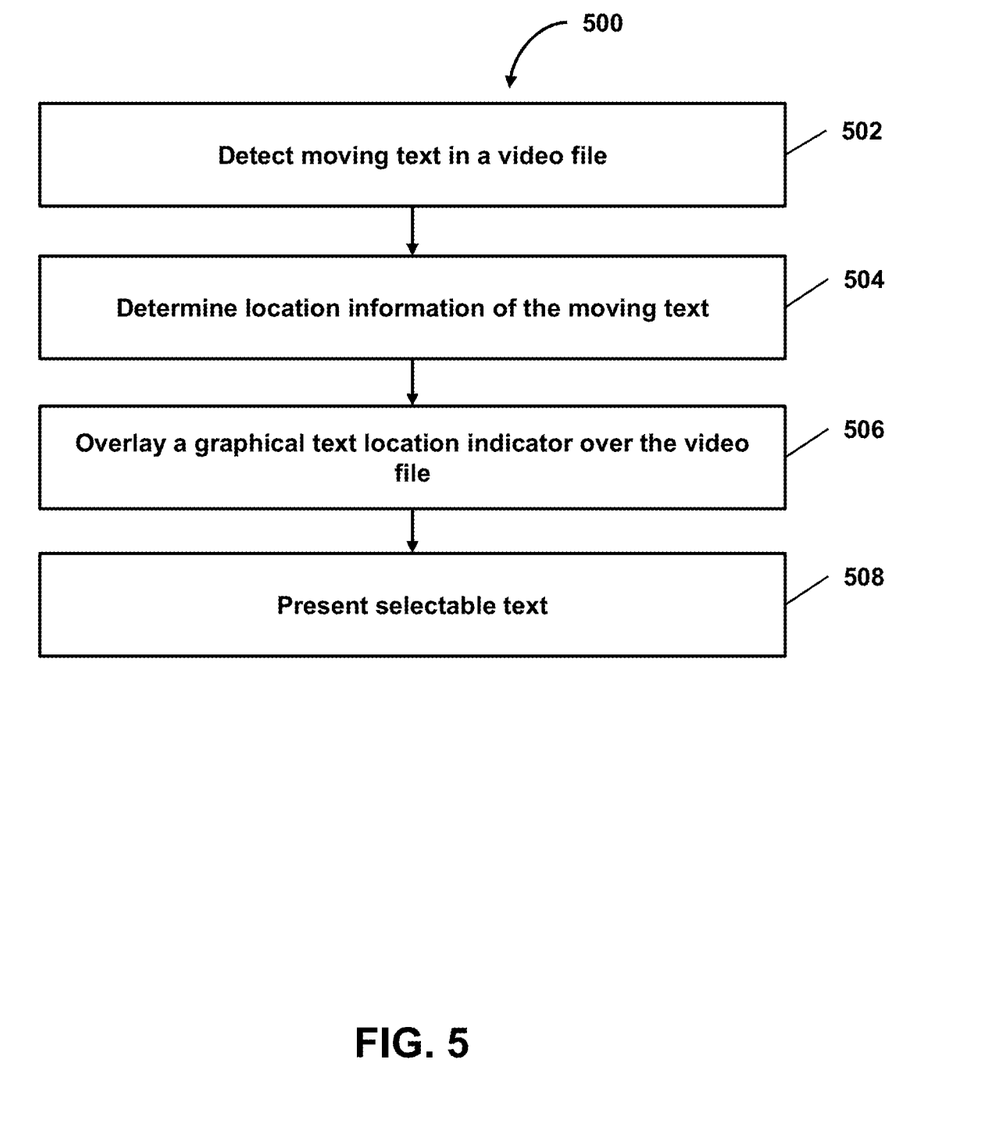
FIG. 5 shows a flowchart of a method for user extraction of in-video text, in accordance with one or more embodiments.

FIG. 5 is an example flowchart of processing operations of a method 500 that enable the various features and functionality of the system as described in detail above. The processing operations of the method presented below are intended to be illustrative and non-limiting. In some embodiments, for example, the method may be accomplished with one or more additional operations not described, and/or without one or more of the operations discussed. Additionally, the order in which the processing operations of the method are illustrated (and described below) is not intended to be limiting.

In some embodiments, the method may be implemented in one or more processing devices (e.g., a digital processor, an analog processor, a digital circuit designed to process information, an analog circuit designed to process information, a state machine, and/or other mechanisms for electronically processing information). The processing devices may include one or more devices executing some or all of the operations of the methods in response to instructions stored electronically on an electronic storage medium. The processing devices may include one or more devices configured through hardware, firmware, and/or software to be specifically designed for execution of one or more of the operations of the methods.

In an operation 502, moving text may be detecting in a video file. For example, a user may refer to text during a presentation of a video file. For instance, the text may be moving text that moves over a time period relative to a center of the video file. For example, where the video file is a live video stream (e.g., such as a presentation), a presenting user may refer to text that is presented during the video stream. Natural language processing may be performed on the video stream (or during the video stream) to detect the moving text. Operation 502 may be performed by a subsystem that is the same as or similar to detection subsystem 112, in accordance with one or more embodiments.

In an operation 504, location information of the moving text may be determined. For example, during the presentation of a video file where moving text is presented, location information associated with the moving text may be determined. For instance, the location information may indicate spatial locations of the moving text over time in the live video stream. Operation 504 may be performed by a subsystem that is the same as or similar to detection subsystem 112, in accordance with one or more embodiments.

In an operation 506, a graphical text location indicator may be overlayed over the video file. For example, where a user refers to text, to ensure that other users may visually see which text has been referred to by the users, a graphical text location indicator may be overlayed over the video file. For example, the graphical text location indicator may be any graphical indicator such as a geometric shape, a letter, highlighting encasing text, a color-coded geometric shape, a box, a color coded box encasing text, or other graphical indicator. Operation 506 may be performed by a subsystem that is the same as or similar to display service subsystem 114, in accordance with one or more embodiments.

In an operation 508, selectable text may be presented. For example, selectable text that corresponds to text that a user has referred to in the video file may be presented on a user interface. For instance, the selectable text may be text which a user may select or otherwise interact with. In some embodiments, an auxiliary indicator may be presented proximate the selectable text in an auxiliary portion of a user interface of a user device. Operation 508 may be performed by a subsystem that is the same as or similar to display service subsystem 114, in accordance with one or more embodiments.

In some embodiments, the various computers and subsystems illustrated in FIG. 1 may include one or more computing devices that are programmed to perform the functions described herein. The computing devices may include one or more electronic storages (e.g., database(s) 132, which may include account database(s) 134, model database(s) 136, etc., or other electronic storages), one or more physical processors programmed with one or more computer program instructions, and/or other components. The computing devices may include communication lines or ports to enable the exchange of information within a network (e.g., network 150) or other computing platforms via wired or wireless techniques (e.g., Ethernet, fiber optics, coaxial cable, Wi-Fi, Bluetooth, near field communication, or other technologies). The computing devices may include a plurality of hardware, software, and/or firmware components operating together. For example, the computing devices may be implemented by a cloud of computing platforms operating together as the computing devices.

The electronic storages may include non-transitory storage media that electronically store information. The storage media of the electronic storages may include one or both of (i) system storage that is provided integrally (e.g., substantially non-removable) with servers or client devices or (ii) removable storage that is removably connectable to the servers or client devices via, for example, a port (e.g., a USB port, a firewire port, etc.) or a drive (e.g., a disk drive, etc.). The electronic storages may include one or more of optically readable storage media (e.g., optical disks, etc.), magnetically readable storage media (e.g., magnetic tape, magnetic hard drive, floppy drive, etc.), electrical charge-based storage media (e.g., EEPROM, RAM, etc.), solid-state storage media (e.g., flash drive, etc.), and/or other electronically readable storage media. The electronic storages may include one or more virtual storage resources (e.g., cloud storage, a virtual private network, and/or other virtual storage resources). The electronic storage may store software algorithms, information determined by the processors, information obtained from servers, information obtained from client devices, or other information that enables the functionality as described herein.

The processors may be programmed to provide information processing capabilities in the computing devices. As such, the processors may include one or more of a digital processor, an analog processor, a digital circuit designed to process information, an analog circuit designed to process information, a state machine, and/or other mechanisms for electronically processing information. In some embodiments, the processors may include a plurality of processing units. These processing units may be physically located within the same device, or the processors may represent processing functionality of a plurality of devices operating in coordination. The processors may be programmed to execute computer program instructions to perform functions described herein of subsystems 112-116 or other subsystems. The processors may be programmed to execute computer program instructions by software; hardware; firmware; some combination of software, hardware, or firmware; and/or other mechanisms for configuring processing capabilities on the processors.

It should be appreciated that the description of the functionality provided by the different subsystems 112-116 described herein is for illustrative purposes, and is not intended to be limiting, as any of subsystems 112-116 may provide more or less functionality than is described. For example, one or more of subsystems 112-116 may be eliminated, and some or all of its functionality may be provided by other ones of subsystems 112-116. As another example, additional subsystems may be programmed to perform some or all of the functionality attributed herein to one of subsystems 112-116.

Although the present invention has been described in detail for the purpose of illustration based on what is currently considered to be the most practical and preferred embodiments, it is to be understood that such detail is solely for that purpose and that the invention is not limited to the disclosed embodiments, but, on the contrary, is intended to cover modifications and equivalent arrangements that are within the scope of the appended claims. For example, it is to be understood that the present invention contemplates that, to the extent possible, one or more features of any embodiment can be combined with one or more features of any other embodiment.

The present techniques will be better understood with reference to the following enumerated embodiments:

1. A method comprising: processing a video to detect text to which a first user is referring in the video; determining, based on the detection of the text, location information associated with the text, the location information indicating spatial locations of the text; overlaying, based on the text location information, a graphical text location indicator over the video on a first portion of a user interface of a user device such that the graphical text location indicator is presented proximate the text; and presenting, on a second portion of the user interface of the user device, selectable text corresponding to the text and an auxiliary indicator corresponding to the graphical text location indicator proximate the selectable text.
2. The method of the preceding embodiment, wherein the text to which a first user is referring in the video is moving text.
3. The method of any of the preceding embodiments, wherein the video is associated with a video communication session is between multiple user devices.
4. The method of any of the preceding embodiments, wherein the video is a live video stream.
5. The method of any of the preceding embodiments, further comprising: presenting, on the first portion of the user interface of the user device, the selectable text in association with the graphical text location indicator such that the selectable text is presented proximate the moving text.
6. The method of any of the preceding embodiments, wherein detecting the text comprises: performing natural language processing on the video to determine one or more utterances of the first user; determining one or more timestamps at which the one or more utterances occur; performing optical character recognition (OCR) of the video at the one or more timestamps to extract textual data presented in the video; determining whether the textual data presented in the video corresponds to one or more of the utterances of the first user; and in response to the textual data corresponding to one or more utterances of the user, detecting the text to which the first user is referring.
7. The method of any of the preceding embodiments, wherein detecting the text comprises: receiving a first user input via the user device, wherein the first user input is a touch, click, long-press, pinch, swipe, or tap; determining, based on the first user input, whether the first user input corresponds to a location of textual data being presented in the video; in response to the first user input corresponding to a location of textual data being presented in the video, detecting the text to which the first user is referring.

8. The method of any of the embodiments 6-7, wherein the detection of the text comprises detecting moving text to which the first user is referring.

9. The method of any of the preceding embodiments, further comprising: performing gesture recognition of a second user presented in the video to determine one or more gestures of the second user; determining, based on the gestures of the second user presented in the video, whether the gestures indicate a positive indication of a reference to textual data presented in the video; in response to determining that the gestures indicate a positive indication of a reference to textual data presented in the video, detecting the text to which the second user is referring.

10. The method of the preceding embodiment, wherein detection of the text to which the second user is referring to is detecting moving text to which the second user is referring.

11. The method of any of the preceding embodiments, wherein the graphical text location indicator is a number presented proximate the text and wherein the auxiliary indicator is the same number as the graphical text location indicator number.

12. The method of any of the preceding embodiments, wherein the graphical text location indicator is a geometric shape encasing the text and wherein the auxiliary indicator is the same geometric shape encasing the selectable text that corresponds to the moving text.

13. The method of any of the preceding embodiments, wherein the graphical text location indicator is a colored highlighting encasing the text and wherein the auxiliary indicator is the same colored highlighting encasing the selectable text that corresponds to the text.

14. A tangible, non-transitory, machine-readable medium storing instructions that, when executed by a data processing apparatus, cause the data processing apparatus to perform operations comprising those of any of the foregoing method embodiments.

15. A system comprising: one or more processors; and memory storing instructions that, when executed by the processors, cause the processors to effectuate operations comprising those of any of the foregoing method embodiments.

What is claimed is:

1. A system for facilitating user extraction of in-video text moving over time in a live video stream, the system comprising:
one or more processors programmed with computer program instructions that, when executed, cause operations comprising:
in response to performing natural language processing and gesture recognition on a live video stream during a concurrent video communication session between multiple user devices, detecting moving text to which a presenting user is referring in the live video stream, the moving text moving over a time period relative to a center of the live video stream;
determining, based on the detection of the moving text, in-video text location information associated with the moving text, the in-video text location information indicating spatial locations of the moving text over time in the live video stream; and
based on the in-video text location information, presenting, simultaneously in both a main presentation region and an auxiliary region of a user interface of a receiving user device, a graphical text location indicator and selectable text corresponding to the moving text such that:
(i) the graphical text location indicator is presented proximate the moving text over the live video stream on the main presentation region of the user interface and presented in the auxiliary region of the user interface; and
(ii) the selectable text is presented proximate the moving text over the live video stream on the main presentation region of the user interface and presented, in the auxiliary region of the user interface, proximate the graphical text location indicator.

2. A method comprising:
processing a video file associated with a video communication session to detect moving text to which a first user is referring in the video file;
determining, based on the detection of the moving text, location information associated with the moving text, the location information indicating spatial locations of the moving text; and
presenting, based on the location information, a graphical text location indicator simultaneously on both a first portion of a user interface of a user device and a second portion of the user interface such that:
(i) a first instance of the graphical text location indicator is presented proximate the moving text over the video file in the first portion of the user interface; and
(ii) a second instance of the graphical text location indicator is presented proximate selectable text that corresponds to the moving text in the second portion of the user interface.

3. The method of claim 2, further comprising:
presenting, on the first portion of the user interface of the user device, the selectable text in association with the graphical text location indicator such that the selectable text is presented proximate the moving text.

4. The method of claim 2, wherein detecting the moving text comprises:
performing natural language processing on the video file to determine one or more utterances of the first user;
determining one or more timestamps at which the one or more utterances occur; performing optical character recognition (OCR) of the video file at the one or more timestamps to extract textual data presented in the video file;
determining that the textual data presented in the video file corresponds to the one or more utterances of the first user; and
in response to determining that the textual data corresponding to the one or more utterances of the first user, detecting the moving text to which the first user is referring.

5. The method of claim 2, wherein detecting the moving text comprises:
receiving a first user input via the user device, wherein the first user input is a touch, click, long-press, pinch, swipe, or tap;
determining, based on the first user input, that the first user input corresponds to a location of textual data being presented in the video file; and in response to determining that the first user input corresponding to the location of the textual data being presented in the video file, detecting the moving text to which the first user is referring.

6. The method of claim 2, further comprising:

performing gesture recognition of a second user presented in the video file to determine one or more gestures of the second user;

determining, based on the gestures of the second user presented in the video file, that the gestures indicate a positive indication of a reference to textual data presented in the video file; and in response to determining that the gestures indicating a positive indication of a reference to the textual data presented in the video file, detecting the moving text to which the second user is referring.

7. The method of claim 2, wherein the first instance of the graphical text location indicator is a number presented proximate the moving text, and wherein the second instance of the graphical text location indicator is the same number as the graphical text location indicator number.

8. The method of claim 2, wherein the first instance of the graphical text location indicator is a geometric shape encasing (i) the moving text in the first portion of the user interface and (ii) the selectable text that corresponds to the moving text in the second portion of the user interface, and wherein the second instance of the graphical text location indicator is the same geometric shape encasing the selectable text that corresponds to the moving text.

9. The method of claim 2, wherein the first instance of the graphical text location indicator is a colored highlighting encasing (i) the moving text and (ii) the selectable text that corresponds to the moving text in the second portion of the user interface, and wherein the second instance of the graphical text location indicator is the same colored highlighting encasing the selectable text that corresponds to the moving text.

10. The method of claim 2, wherein the video communication session is a communication session between multiple user devices.

11. The method of claim 2, wherein the video file is a live video stream.

12. One or more non-transitory computer-readable media comprising instructions that, when executed by one or more processors, cause operations comprising:

in connection with processing a video associated with a video communication session, detecting moving text to which a first user is referring in the video;

determining, based on the detection of the moving text, location information associated with the moving text, the location information indicating spatial locations of the moving text; and presenting, based on the location information, a graphical text location indicator on both a first portion of a user interface of a user device and a second portion of the user interface such that:

(i) a first representation of the graphical text location indicator is presented proximate the moving text over the video in the first portion of the user interface; and (ii) a second representation of the graphical text location indicator is presented proximate selectable text that corresponds to the moving text in the second portion of the user interface.

13. The media of claim 12, the operations further comprising:

presenting, on the first portion of the user interface of the user device, the selectable text in association with the graphical text location indicator such that the selectable text is presented proximate the moving text.

14. The media of claim 12, wherein detecting the moving text comprises:

performing natural language processing on the video to determine one or more utterances of the first user;

determining one or more timestamps at which the one or more utterances occur; performing optical character recognition (OCR) of the video at the one or more timestamps to extract textual data presented in the video;

determining whether the textual data presented in the video corresponds to the one or more of the utterances of the first user; and in response to the textual data corresponding to the one or more utterances of the first user, detecting the moving text to which the first user is referring.

15. The media of claim 12, wherein detecting the moving text comprises:

receiving a first user input via the user device, wherein the first user input is a touch, click, long-press, pinch, swipe, or tap;

determining, based on the first user input, whether the first user input corresponds to a location of textual data being presented in the video; and in response to the first user input corresponding to the location of the textual data being presented in the video, detecting the moving text to which the first user is referring.

16. The media of claim 12, the operations further comprising:

performing gesture recognition of a second user presented in the video to determine one or more gestures of the second user;

determining, based on the gestures of the second user presented in the video, whether the gestures indicate a positive indication of a reference to textual data presented in the video; and in response to the gestures indicating a positive indication of a reference to the textual data presented in the video, detecting the moving text to which the second user is referring.

17. The media of claim 12, wherein the first representation of the graphical text location indicator is a number presented proximate the moving text, and wherein the second representation of the graphical text location indicator is the same number as the graphical text location indicator number.

18. The media of claim 12, wherein the first representation of the graphical text location indicator is a geometric shape (i) encasing the moving text in the first portion of the user interface and (ii) the selectable text that corresponds to the moving text in the second portion of the user interface, and wherein the second representation of the graphical text location indicator is the same geometric shape encasing the selectable text that corresponds to the moving text.

19. The media of claim 12, wherein the first representation of the graphical text location indicator is a colored highlighting encasing (i) the moving text and (ii) the selectable text that corresponds to the moving text in the second portion of the user interface, and wherein the second representation of the graphical text location indicator is the same colored highlighting encasing the selectable text that corresponds to the moving text.

20. The media of claim 12, wherein the video is a live video stream.

\* \* \* \* \*